J. J. MATHESON.
FISH TRAP AND THE ART OF FISHING.
APPLICATION FILED APR. 16, 1918.
1,363,424.  
Patented Dec. 28, 1920.
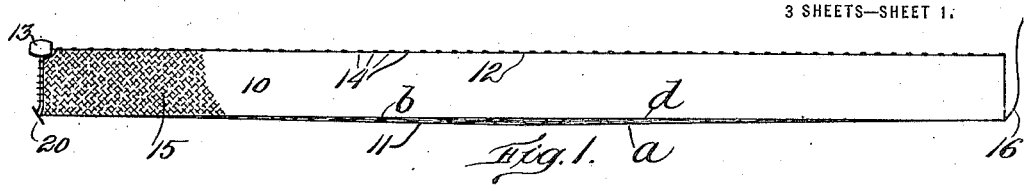
Fig. 1.
Fig. 2.
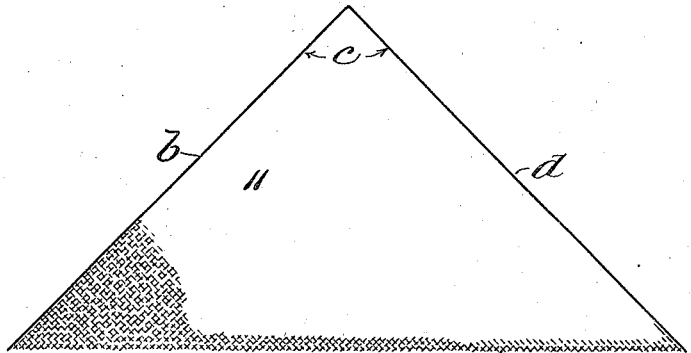
Fig. 3.
Fig. 4.
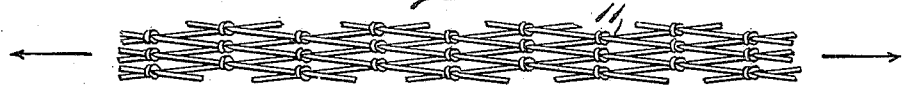
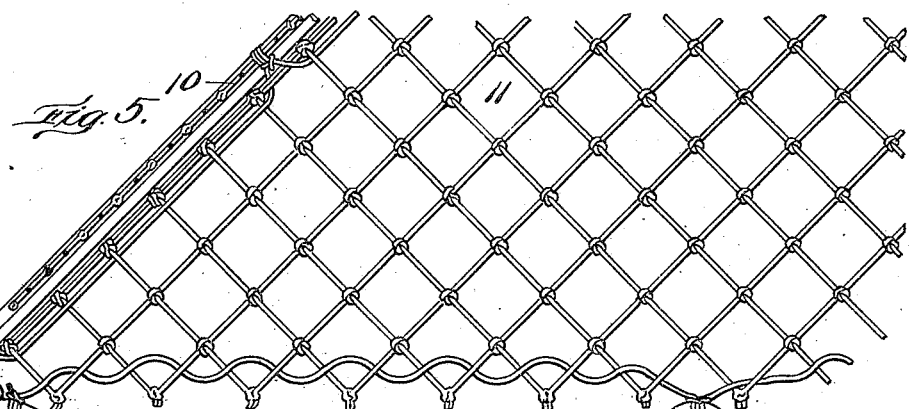
Fig. 5.
Inventor:
John J. Matheson,
By Mitchell, Chadwick & Kent
Attys.

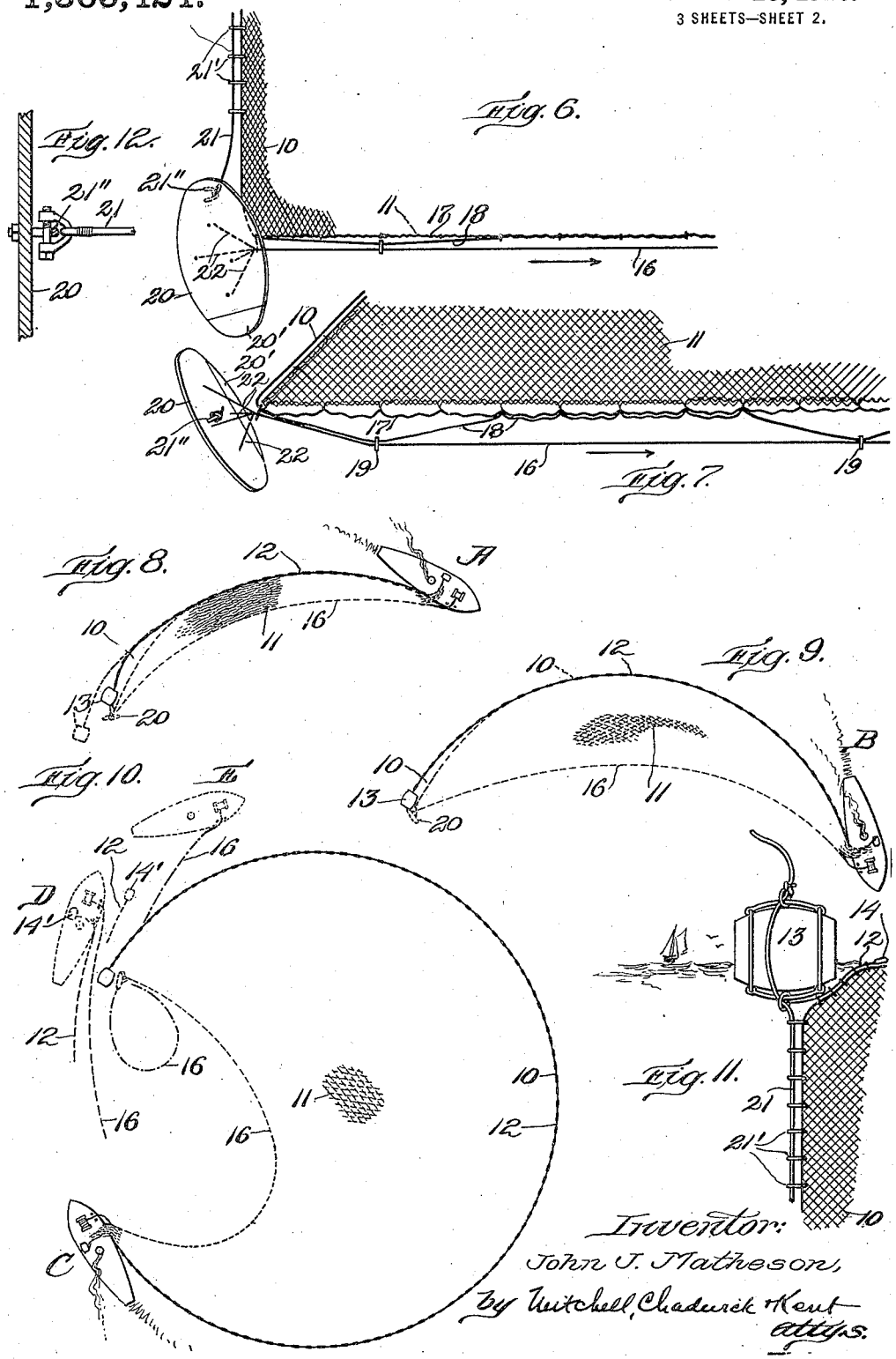

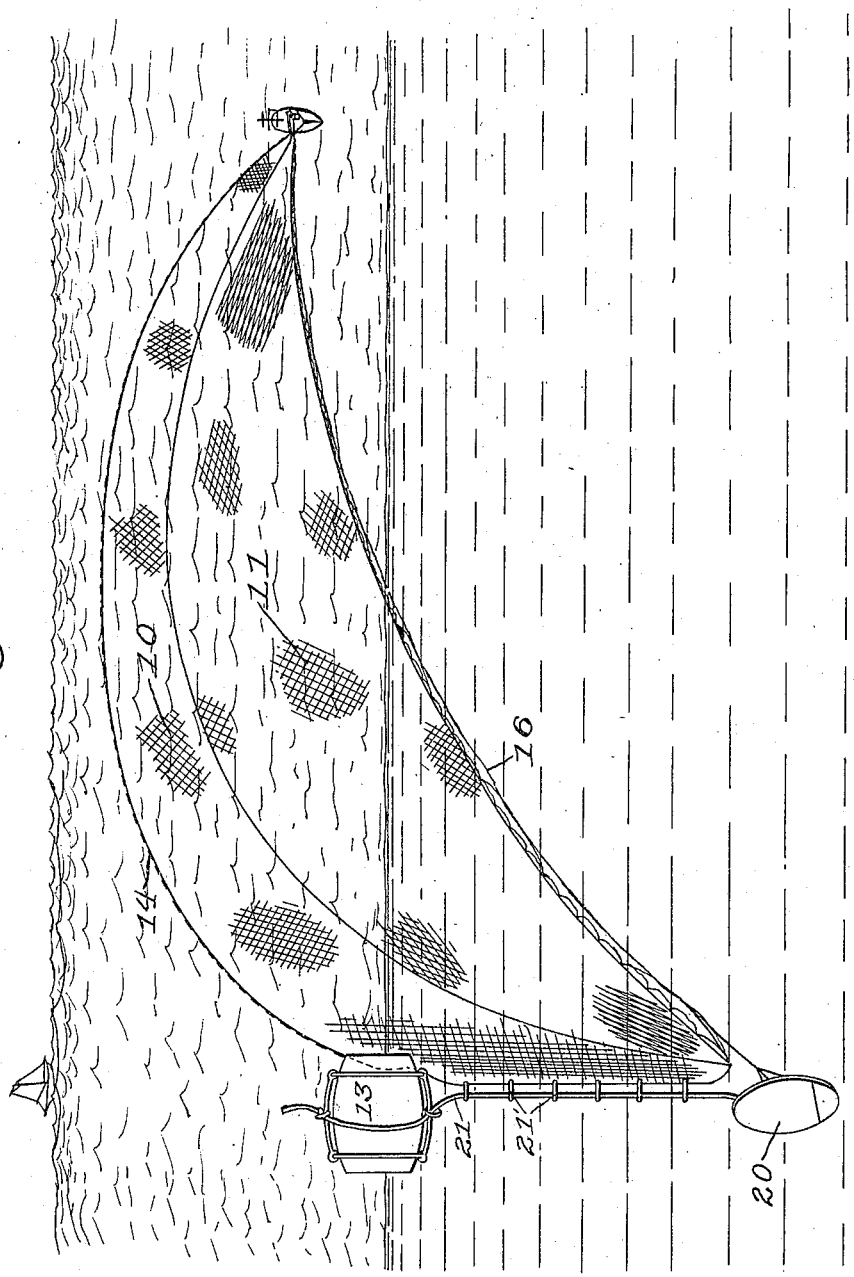

UNITED STATES PATENT OFFICE.

JOHN J. MATHESON, OF GLOUCESTER, MASSACHUSETTS.

FISH-TRAP AND THE ART OF FISHING.

1,363,424.      Specification of Letters Patent.      Patented Dec. 28, 1920.

Application filed April 16, 1918. Serial No. 228,950.

*To all whom it may concern:*

Be it known that I, JOHN J. MATHESON, a citizen of the United States, residing at Gloucester, in the county of Essex and State of Massachusetts, have invented certain new and useful Improvements in Fish-Traps and the Art of Fishing, of which the following is a specification.

This invention relates to improvements in fish traps and the art of fishing. More especially it relates to nets hanging from a buoyed headline in the open sea and set to inclose a school of fish seen on the surface, or otherwise set in a curve, with a bottom drawn under the area as by a purse line. The invention is applicable with seines constructed as heretofore known; but the invention also provides, and preferably uses, new apparatus, simple and easily managed, by which important new results may be attained. In particular, the invention makes it possible that such a net can be set and pursed by a power-vessel of sea going size, beginning and continuing while the vessel is under way, instead of having to be set from a large separate seine boat, as in the best practice heretofore known. Also, that the net can be set and pursed in a fraction of the time required heretofore; and can surround a school of fish completely, without the customary open place under the vessel. Also that the bottom can be spread completely under the fish almost as rapidly as the side or vertical part is set around them. Also, that all of this can be done by power, without drawing down the net from the surface of the water and without drawing the vessel in toward the middle of the area inclosed; and that the net can be drawn aboard with greater ease than heretofore after being set. Also, that it can have the bunt, in which the fish are finally gathered, of stouter cord than has heretofore been practicable, so resistant to sharks and other fish that are wont to tear the present nets that the occasional loss of fish now experienced, and the expensive delay while the nets are being mended at sea, can be eliminated. Also, that the net can be worked with fewer men, and that substantially all of those carried can be utilized in the fishing. And also that it dispenses entirely with the need of carrying the large additional boat heretofore required for setting a seine. It furthermore permits fishing to go on under conditions of sea in which fishing has heretofore been impossible, and of fog in which the men cannot safely leave the vessel to set a net. For these reasons, and for others which are characteristic of the apparatus and of the method of procedure, the invention provides means for an important increase in the efficiency, or percentage successfully caught of each school of fish; a notable increase in the safety of human life engaged in the occupation of fishing; a material reduction in the first cost of equipment, and also in the cost of maintenance of equipment for a fishing trip, and a great reduction in the time required by a vessel for getting a full fare of fish, thereby both decreasing the cost and increasing the market supply of this variety of food.

The invention may be applied for catching any kind of fish which go in schools, or any other kind of fish for which a buoyed net of any size is set in open water. As the invention provides means by which the net is immune from danger of becoming fouled with the vessel's propeller or rudder, and so can be set from a ship of any size, the net itself can be made stout enough to be adapted for larger fish than have heretofore been caught successfully by seine in open sea; and for schools of fish heretofore customarily seined, a smaller net than heretofore found requisite can be used, on account of the superior speed and security of the setting. Moreover, the twine or netting on the vertical portion does not need to be either as full or as deep as in ordinary seines.

These numerous new results, and other advantages, some of which are mentioned hereinafter, are obtained by a structure and method of operation which are essentially simple. A net embodying the invention may have a rectangular portion of suitable length adapted to be set by a vessel encircling the fish, so as to hang vertically in the water, and a bottom portion hitched to its lower edge and adapted to be spread under the entire inclosure. The bottom portion is made so that when set it is hauled straight, going down somewhat like a rope, lying along the entire lower edge of the vertical portion, with meshes closed, and yet can be spread with perfect freedom, its meshes opening to square form and beyond as circumstances may require, without pulling seriously on the vertical portion, as its own free edge moves across the inclosure.

The net bottom, for illustration, may be so made that when laid out flat, with its meshes square, it constitutes a right angled triangle, with its twine running parallel to the two sides of the triangle which make the right angle. Those two sides being designed so that their sum is equal to the total horizontal length of the vertical hanging or side portion of the net as it is to be set, they can be hitched along the bottom edge thereof with their right angled apex at the middle thereof. When the said lower edge is straight these two sides become straight; and the third side of the triangle, opposite them, stretches to substantially equal length; and the distance of that side from the apex of the triangle shrinks to practically zero. Said opposite side is equipped with small bridles and light rings through which runs a suitable pursing rope, to which is attached a sea anchor, at the end that is first to be set, arranged to dive quickly away from the vessel to a depth equal to that of the hanging net where it acts as a drag. If then the pursing rope be paid out more slowly than the net, as the vessel proceeds on its curved circuit in setting the net that rope cuts across the curve and gradually draws out the free edge of the bottom, spreading the bottom, under the area inclosed. The bottom can be drawn the final part of the way as the circuit is completed by a winch on the vessel or by the mere act of the vessel in continuing to sail on her course without paying out more of the purse line. The vessel then returns to the place where the ends of the net are lapped, and takes aboard both ends and the complete free edge of the bottom, which is pursed into very small space. The net is then drawn aboard, pulling on the portion last set, until the fish are all inclosed in the bunt, of stout cord, which is at the end first set.

One embodiment of the improved apparatus provided by the invention is illustrated in the accompanying drawings, but it is to be understood that the invention may be applied in various ways other than that specifically here illustrated, and parts of it used with other apparatus, within the scope of the appended claims. It is intended that the patent shall cover, by proper expression in the appended claims, whatever features of patentable novelty exist in the invention disclosed.

In the drawings, which are more or less diagrammatic and in some respects distorted:

Figure 1 represents apparatus embodying the invention, set in the water in a straight line, hanging vertical, and seen in side elevation;

Fig. 2 represents a preliminary stage of the part of the net shown in the bottom part of Fig. 1;

Fig. 3 shows the form of the bottom if laid out flat with its meshes uniformly open square, and is on the same scale as Figs. 1 and 2;

Fig. 4, on a much larger scale, indicates how meshes are closed when hauled straight;

Fig. 5 is a detail of a fragment of the apparatus, in plan, with meshes of the bottom uniformly open square;

Fig. 6 is an elevation of the lower part of the first end of the apparatus, showing the sea anchor, assuming the side net to be vertical and the bottom net horizontal, with the edge cords held out to view;

Fig. 7 is a plan of the same, assumed to be in horizontal section, and with the bottom partly spread;

Figs. 8, 9 and 10 are diagram plans showing different stages of the setting of the apparatus in the sea;

Fig. 11 is an elevation of another detail, the float at the beginning of the trap;

Fig. 12 is a section showing enlarged a detail of the adjacent Fig. 6; and

Fig. 13 is a diagrammatic representation in perspective of the apparatus in process of being set in the sea, represented with the sea in section through the float and sea anchor 13, 20, and with the apparatus assumed to be sunk in the water shown.

As illustrated in the drawing the trap has two main net portions, respectively herein called the vertical or side portion 10 and the bottom portion 11. The dimensional relation which the two parts may bear to each other is illustrated in Figs. 1, 2 and 3. For comparison with nets made according to the best standards heretofore known, the vertical portion 10 in Fig. 1 may be assumed to have a length of 250 fathoms (1500 feet) and a depth of 16 fathoms (about 100 feet) when hanging straight down in the water, being rectangular. The bottom portion is represented as having the shape of a right angled triangle, when laid out flat with its meshes square, with the sides of its meshes parallel to the sides $b$ and $d$ of the triangle, between which the right angle is formed, and as having those two sides each one-half of the length of the vertical portion, or say 750 feet. With such dimensions, the hypotenuse $a$ would be about 1060 feet long when so laid out, and would stretch, when the entire bottom is hauled straight with its meshes closed as in Fig. 4 to a length of about 1500 feet as in Figs. 2 and 1. The sides $b$, $d$ are hitched to and hung on the lower edge of the vertical portion, preferably on the foot line thereof, in the usual manner in which one net is hung on another, or on a line, leaving the hypotenuse $a$ as a free edge capable of stretching and shrinking by change of form of its meshes. The vertical portion 10 is securely hung on a headline 12 equipped at one end with a suitable float 13, and buoyed with corks 14 at intervals. Stouter twine than elsewhere may be used, as heretofore, for the part of the net, herein called its bunt, which will be last taken aboard, to resist the concentration of fish therein. This, however, may be of larger cord than has heretofore been practicable; and it preferably is at the end where the float is, at the position indicated in a general way by the numeral 15. Although called a "bunt" and although at the end, it need not have more fullness than the rest. In hitching the vertical portion on the head line, it is preferably hung on a third, i. e., so as to cover a distance one-third less than the length to which the same netting would stretch if hauled straight with its meshes collapsed as in Fig. 4. This makes the meshes about square and economizes twine, as contrasted with present practice in which usually the net is hung on a half, 1500 feet of headline holding a net that would reach 3000 feet if drawn straight, only 2250 feet being required, when it is hung on a third, to make the 1500 feet length of net. And there is a further economy, in that considerably less depth seems adequate for the vertical portion of the net of the invention, about 16 fathoms (96 feet) being represented, as contrasted with customary practice which requires 25 fathoms (150 feet) with ordinary seines. However, sizes of mesh, dimensions, and proportions will naturally vary according to the kind of fish, the circumstances, and experience. It is thought probable that both the length and the depth shown herein for comparison with existing standard seines will be found larger than is needed for doing similar work.

The bottom net is in hauled straight condition when hung on the foot line of the side or vertical net. That is, assuming that the vertical portion is hitched to a headline and is laid out with its meshes having the opening which its hitching thereon gives them when hanging vertically therefrom, the bottom portion which when laid out with its meshes open square has the triangular form shown in Fig. 3, is attached with its meshes closed as in Figs. 2 and 4, which condition is attained by hauling it straight, and in which condition its length is equal to that of the top line of the vertical section. It is attached to the bottom edge of the vertical portion by its sides $b$, and $d$, the angle $c$ between those sides having practically disappeared because it is thus hauled straight, and the third side $a$ having at the same time stretched to a length which is practically the same as that of the two sides. A purse line 16 runs along the free side $a$ of the bottom 11, being attached by bridles and by light rings, as contrasted with heavy rings now used for a purse line at the bottom of a seine. This attachment may be made in any suitable manner, the construction illustrated being one in which two cords 17, 18, are hitched to the edge of the bottom piece, one of them being hung on all the way, and the other being hung to that cord and thus to the net for a space of two fathoms or so, and then being free for a space of two fathoms or so, alternating thus through the whole length. One of these cords may preferably be of right hand and the other of left hand twist. Light rings 19 are hitched to the middle of each free section of the cord 18. This construction makes a series of small bridles through which the purse line 16, may be a thin wire rope, heavy enough to sink quickly, can easily slip along the free edge of the bottom portion of the net, rather close thereto. One end of the purse line is attached to a sea anchor 20 which is tied by a cord 21 to the float 13 so that if the parts were at rest in the water the net end could hang vertically under the float to the level of the full depth of the vertical portion instead of being gathered up to a shallow depth as is now customary with the end part of a seine. To this cord the initial end of the vertical portion is attached by light slip rings 21'. The sea anchor may be a disk, such as a round board a couple of fathoms or so in diameter. It should be heavy enough to sink readily, smooth enough to slip quickly through the water edgewise, and preferably weighted at the bottom with lead 20' so as not to turn wrong edge up. This latter matter is further safeguarded by the attachment of the cord 21 to that part of the anchor which should be above a bridle 22; and the fastening device 21" preferably is such that it is easily disconnected. The anchor's connection to the purse line is by a bridle 22 of such construction that the anchor assumes a position with its plane at an oblique angle to the direction in which the purse line is pulling, tilted with that part in advance which is lower and is toward the circle in which the net is to be set. To attain this end, the bridle 22 of the sea anchor may consist of four chains leading from the disk, attached about equidistant from its center, to the purse line, and differing from each other in length so that when all are taut and the purse line is pulling horizontally, or in a direction approaching the horizontal, the inward lower chain is shortest, and the outward lower and the inward upper are somewhat longer, and the outward upper is longest. Being dropped into the water from the vessel in a position of parallelism with the starboard side of the vessel, with its leaded part down, with its shortest chain in advance and with the face of the anchor to which the chains are attached facing toward the vessel, the purse line being between it and the vessel, the anchor disk will dive downward to starboard as soon as it feels the pull of the purse line, promptly after being dropped into the water. Thus it clears the vessel, and carries the net away from the danger of fouling the propeller. The line suspending this anchor from the float above, dropped at the same time, keeps it from descending too far. The resistance afforded by the net, and the gradual reduction of the pull reaching the anchor through the pursing line, prevent it from proceeding indefinitely sidewise. The hook shape into which the anchor thus pulls the initial end of the net, however, serves the double purpose of retaining or turning back fish that may swim along the net in reverse direction, before the net is fully set and closed; and of making sure that the edge of the net is at a safe distance inside of the float when the vessel later comes by to lap the final end of the net outside of the end first set. This line 21 is so arranged that it can be lengthened or shortened, as by variously locating its knot (Fig. 11) which engages the float 13, thus fixing the depth to which the net will settle when set. This part of the net can be worked at its full depth, and it is only a question of what depth is desired.

The trap thus constructed may be carried on the deck of a power vessel of any convenient size, with the net folded in laps ready to be drawn over the side of the vessel. That portion which is to extend vertically is then condensed into a few feet of width; the bottom portion lies in its hauled straight condition somewhat like a rope along the edge of this few feet; with its bridles clear alongside; and the purse line runs through them, and through tackle or a device of any suitable sort by which the rate at which it is paid out can be controlled. It may run to a winch, in which case it can be drawn in again easily by power at will. The sea anchor 20, the float 13, and the first part of the net and of the purse line may hang over the starboard side of the vessel, which is the side on which nets of this type are customarily set, ready to be dropped by the mere releasing of a rope or a catch. A school of fish having been seen, and the vessel having reached a proper position, the float and anchor and beginning of the net can be released at once, without bringing the vessel to a stop, and the vessel can continue on her course under power around the circle or loop in which it is desired to set the trap in order to inclose the fish. Stages of this operation are illustrated in the accompanying drawing. Fig. 13 illustrates the stages in a somewhat composite and diagrammatic way. The net 10 is supposed to hang vertically in the water and the net 11 is being spread horizontally from the lower edge of 10, under the water, by the paying out of the line 16 from the vessel at a slower rate than the net 10 and attached net 11 are paid out, the meshes of the net 11 gradually opening as its free edge is drawn away from the bottom of the net 10, and varying in degree of opening according to circumstances and local conditions. Starting with the vessel at the location where the float 13 is portrayed, the first action is to drop the float and sea anchor while the vessel is sailing. Tension on the purse line accelerates the sinking of the sea anchor and guides it inward toward the center of the circle and away from the ship and the propeller. The danger of the net becoming fouled in the propeller, especially at the beginning or at the end of the setting of the net, has hitherto been a barrier to setting from a power vessel. This anchor may lie flat against the side of a vessel when dropped and may strike the water edgewise in the direction in which the vessel is being propelled; but its dragging in the water quickly turns it so that all four chains of its bridle are taut, in which case the anchor itself assumes the angle in respect to the direction of pull which these chains predetermine, and the rush of the water upon it, at this angle, causes it to slip downward and inward toward the circuit center. As the vessel proceeds around the circle, the purse line may be kept taut by paying it out less rapidly than the net, with the result, illustrated in the drawings, that the purse line becomes somewhat like a chord of the arc in which the vertical part of the net is being set. Since the free edge of the bottom is attached to it, the bottom of the net is extended to a corresponding degree, and fills the area between the chord and the arc. Since the meshes of the bottom portion of the net were hauled straight when set, and the net is being set in a curve they can easily open to permit this extension without pulling down at all on the vertical portion. As the vessel gets farther around the circle, the location of the purse line becomes less like a straight line and more curved, as illustrated in the drawing. This depends upon the degree to which the purse line is held back with respect to the remainder of the trap. It is feasible to let it go out as rapidly as the vertical part of the net goes out, in which case the net would be positioned with its bottom meshes still hauled straight and lying under the vertical portion, and then after the whole has been set, to draw the bottom across by pulling on the purse line. It is believed most desirable, however, to draw it as the vessel proceeds, for the double reason of saving time, and because by this means the power of the main engines of the vessel is utilized for hauling the purse line. Moreover, the chance that fish may escape by diving is reduced by the earlier drawing of the bottom; and the resistance of the water to the drawing is less. The vessel proceeds around the circle to a little beyond the point of beginning, and the circle or loop should be so planned and managed that the end of the net overlaps outside of the beginning of the net. Assuming that the bottom was pulled gradually as the vessel went around, it will be evident that when the end of the net has overlapped the beginning, the vessel may cease paying out the purse line, and by merely continuing on her course for a short distance, may continue to pull upon it and thus finish the pursing of the bottom, thus making a complete inclosure of the school of fish. The vessel may then return to the place where the two ends overlap and, drawing in the purse line as she goes, can keep the trap closed until the lap is alongside. There the part of the net first set may be taken aboard with the float and anchor; and also the whole of the purse line and its rings and adjacent edge of the bottom, all closely condensed together; and also the end of that part of the net which was set last; and the work of pulling in the part of the net which was last set may begin, taking it and the bottom gradually aboard. During this process, the size of the circle inclosed by such part of the net which remains in the water becomes smaller and smaller, but the vessel is not drawn into the center of the circle, as has been a recognized evil in pulling a seine by methods previously known, and the net does not get afoul of the propeller, for several reasons. The greater body of the vessel and its consequent greater resistance to being pulled broadside through the water, aided by its keel and rudder and power, can keep the vessel away, the action of the wind on the body of the vessel or even on sails set for the purpose can be availed of to keep the vessel off from the net; and the pull on the seine, especially if it be from the forward part of the vessel, will tend to keep her headed more toward the net and to keep the propeller away in clear water. Moreover, the net is not nearly so deep as heretofore and preferably the bunt of stout cord meshes is not in the middle of it and does not exert its resistance to oppose the pull by drawing the vessel, but is close to the vessel and tends to stay there while the pull draws in the thinner twine of the circle. When this drawing is completed, the fish are close at hand by the vessel in the bunt where they can be taken directly aboard. Because the net is set and drawn by power, and from a sizable vessel, and because the bunt does not need to be drawn a long distance through the water, it is feasible to make this part of the net of unusually strong cord, strong enough to resist the ravages of sharks and dog fish and others which heretofore at times have given great trouble by breaking nets of the light twine which it has been necessary to use heretofore on account of the limitations of the auxiliary boats from which they are set.

The shape of the bottom, when spread with its meshes square, may be variously designed; but it will be observed that if it be of the shape illustrated and, for example, be applied to a vertical portion hung on a headline 1,500 feet long, which would set into a circle about 480 feet in diameter, its dimension of 1,060 feet on its free side and of 530 feet from its apex $c$ perpendicularly to its free side, (when laid out as a triangle with meshes square) are sufficient for all purposes even if the net be set in a rather long and narrow loop, to spread under any circle or loop which the vertical section can surround, without seriously pulling that vertical section. The speed with which the trap can be set makes it possible to sail closer to a school of fish, and thus to use a shorter net effectively. The speed of setting is superior to anything heretofore practicable both because the vessel goes under power, and also because the net can be paid out much more rapidly from the deck of the vessel than by the men who perform that duty under the limitations that exist when the net is carried in a boat propelled by oars.

The sea anchor may contribute toward preventing the escape of the fish from the net if it be painted white. Its oscillations in the water under the pull of the pursing rope, coupled with the glare from it, at the depth at which it is set, will have the effect of keeping fish away from its region if any head in that direction before the net is fully set. In nets as heretofore worked, the purse line rises at a slope, to the boat at one end, and to the beginning of the net, which is puckered and set shallow, at its other end; and after being picked up, while the net is being drawn in, it rises to the boat at this end also. The boat is always close to the work and there is a space under the boat through which fish can go out. Although the original closure as above defined is a complete lap, it may be objected that it is not tight because of the anchor being swung inward. The closure can however be made tight. The vessel can sail a little distance beyond the float and anchor, after making the lap, paying out purse line, so that the purse line will lie in the water rising to the vessel at a smaller slope, and then, ceasing to pay it out, can sail so that this rope will come close under or even inside of the sea anchor. As the sea anchor always stands at an angle approaching perpendicularity to the line which is pulling it, and as the direction from which the pursing line pulls on the sea anchor constantly changes as the vessel proceeds around the circle, it may be found lying approximately parallel to the course of the vessel when the circuit is completed. It can therefore be easily pulled up and detached, and taken out of the way.

Figs. 8, 9 and 10 illustrate five stages of the operation, with the corresponding positions A, B, C, D and E of boat, buoy line and purse line. The latter end of the net may be marked by the small float 14'. The adjacent dot and dash line in Fig. 10 indicates how the sailing power of the vessel can continue pursing, after the net is wholly dropped, and can also swing the under part of the lapped end of the net close against the beginning thereof.

Moreover, as the edge of the bottom can shrink to almost nothing in length, owing to the way its meshes are arranged, there is no cumbersome quantity of twine or cordage at its edge, but the entire edge can be neatly handled, with the bridle rings all close together.

It is obvious that the float and the sea anchor may be varied in size according to needs of the net for which they are used, the latter always being large enough and with its bridle chains of suitable design to afford the needle resistance coupled with quick diving and the former being always large enough to hold up the anchor. In case it is desired to suspend the whole length of the net at less depth, this can be accomplished by providing occasional cord supports for the bottom hung on the headline, of desired length. The shallowness of the net of the invention, and the possibility of using it successfully even when set very shallow is an advantage of considerable importance, because it is sometimes desirable to set seines over shoals where, if a net hung at the depth heretofore found necessary in order to catch the fish, it would be so near the bottom as to be in danger of damage by rocks and wrecks which more or less abound on the shoals. The considerable depth of large seines at present in use, as is well known, is not necessitated by the level at which the fish play, but is to permit the pursing of the seine easily without setting it so close to the fish as to scare them. Although a depth of 16 fathoms has been suggested, illustrated in the drawing, it is believed probable that not even so much depth as that is necessary; and in fact no reason appears why the bottom should not be hung on the vertical portion so as to be spread fairly close under the fish in a large net such as that illustrated as well as in small nets used for other kinds of fish. The possibility of using a vertical net portion which is hung on a third, on the headline, results from the working of the bottom portion. In nets as heretofore constructed it has been necessary to haul in a large quantity of vertical hanging twine in order to close the net at the bottom and it has been found to pull easiest when hung on a half or thereabouts because this allows sufficient twine for it to belly out beyond the headline and boat line while being drawn. But with the arrangement herein disclosed, in which the bottom is spread without pulling in the side walls of the trap, and in which those side walls are pulled in endwise, as it were, by pulling only on one end of the net, and the bottom is slack, it is feasible to use the square and stiffer arrangement of netting which results when it is hung on only a third.

The correlation between shape and arrangement of material, including edge cords, in the portion of the net which hangs vertical and that in the bottom portion is such that when the lower edge of the former is extended straight the bottom cannot be spread. In consequence, it cannot hang down materially below the lower edge of the side portion, assuming the latter to be set in a plane. Although it contains enough twine to be extended horizontally when the ends of said lower edges are brought together, a great quantity of twine heretofore used in nets having an apron hanging vertically under is thus saved, both as to cost and as to labor of hauling through the water. Moreover, the automatic clamps, or the weak twine ties, customarily used to hold such an apron to the seine may be omitted. Although the manner of setting the net in a complete circuit has been illustrated in detail, the invention can be utilized to spread a bottom net in cases when it is not intended to complete the circle. And also the anchor and purse line can be used with benefit, substantially as described, with a seine having a depending apron as in past practice, without the special arrangement of bottom herein described.

I claim:

1. A fish trap comprising the combination of a buoyed head line, a net adapted to hang therefrom with meshes open; and a net attached along the lower edge of said hanging net, lying close thereto with meshes straight and closed when said edge is straight, and adapted to be spread to fill the bay formed thereby when said edge is curved.

2. A fish trap comprising the combination of a buoyed head line; a net adapted to hang therefrom with meshes open; a foot line therefor; and a bottom net attached along that portion of the foot line which is under the hanging net, and having, when hauled straight, substantially the length thereof.

3. A fish trap having in combination an open mesh side net; a closed mesh bottom net, attached along the lower edge of the side net and means extending along the free edge of the closed mesh net adapted to draw the free edge out from said edge of the side net thereby opening the meshes of said closed mesh portion, without materially pulling the side net.

4. A fish trap having a head line and a foot line, with a net intervening and hitched to each with its meshes open about square when the lines are laid out straight and the net is flat; and a net hitched to the foot line in such manner that its meshes are hauled straight and closed when the first mentioned net is so laid out.

5. A fish trap comprising the combination of a head line, a foot line, an intervening open mesh net, and a bottom net attached along the foot line, broader in its middle than at its ends, when laid out flat with its meshes uniform, and with the twine of the edge of the bottom net bordering on the foot line running parallel thereto, and with its edge remote therefrom free to stretch and to shrink in length by change of form of its meshes.

6. A fish trap comprising a net adapted to be set vertical and a bottom net attached along its lower edge; the bottom net, when laid out flat with its meshes uniformly open being broadest in its middle portion, and having its free edge able to stretch and to shrink, in length in the direction in which the edge extends, by change of form of its meshes to and from a condition in which the meshes are hauled straight.

7. A fish trap comprising the combination of a net adapted to be set vertical and a bottom net attached along is lower edge, the bottom net being, when laid out flat with its meshes uniformly open, broadest in its middle portion and having the twine in its edge which is next to the vertical net extending substantially parallel to the edge of said net; said edge twine, when laid out as aforesaid, extending in two directions which make an angle with each other substantially like the angle of the mesh of said bottom net.

8. A fish trap comprising the combination of a head line, a foot line, and intervening open mesh net, and a bottom net attached along the foot line; said bottom net, when laid out flat with its meshes uniform, being broadest in its middle portion and arranged with its meshes which are next to the foot line inextensible in the direction of the foot line and having its free edge capable of stretching and shrinking in length by change in form of the meshes along said edge.

9. A fish trap comprising the combination of a head line, a foot line, an intervening open mesh net, and a bottom net attached along the foot line, broadest in its middle portion, when laid out flat with its meshes uniformly open, and having its free edge approximately straight when so laid out.

10. A fish trap comprising the combination of a net adapted to be set vertical and a bottom net, attached along its lower edge, the latter being in the form of a right angled triangle when laid out flat with its meshes square, with the twine of its meshes parallel to the sides between which the right angle of its edges is made.

11. A fish trap having side and bottom net portions, the latter being of a shape which is approximately triangular when laid out flat with its meshes uniformly open, and having two sides of the triangle attached to the lower edge of the side portion.

12. A fish trap, having a buoyed head line; a net depending therefrom with open meshes; and a bottom net attached to the lower edge of the depending net, in which bottom net spread in breadth is correlative with contraction of length, the two being attached together with the extreme length of the bottom corresponding to the normal length of the depending net, whereby the spreading of the bottom is correlative with an approach of the ends of the depending net to each other.

13. A fish trap having in combination a side net; a bottom net, attached along the lower edge of the side net and having a free edge adapted to be extended therefrom, thereby to spread the net under the area inclosed; a purse line extending loosely along said free edge; and a sea anchor at one end of said purse line and nets.

14. A fish trap having a buoyed line; a net depending therefrom, with ends substantially equaling its middle in depth, and means causing its end which is first set to sink to said full depth laterally away from the boat from which it is set.

15. A fish trap having a buoyed head line; a net depending therefrom; a board adapted broadside to resist and edgewise to slip through the water, attached to the lower part of the end of said net and adapted by its attachment to dive sidewise drawing the net with it when pulled forward.

16. A fish trap having a buoyed head line; a net depending therefrom; a board adapted broadside to resist and edgewise to slip through the water, attached to the lower part of the end of said net, and adapted by its attachment to dive downward more quickly than it would naturally sink, drawing the net downward with it, when pulled forward.

17. A fish trap having a buoyed head line; a net depending therefrom; a board adapted broadside to resist and edgewise to slip through the water; and a bridle and line engaging the lower part of the end of the net and attached to the side of and adapted to pull said board, the bridle being arranged with its lower fastening to the board on one side in advance of its other fastenings, whereby when pulled against the water the board inclines and dives quickly downward and laterally as respects the direction of pull.

18. A fish trap having a buoyed head line; a net depending therefrom; a board adapted broadside to resist movement through the water, and a bridle and line engaging the lower part of the net and attached to the side of and adapted to pull said board, the bridle being arranged with its attachments holding the board at an angle not perpendicular to the direction of pull; and the said board having its lower portion weighted more densely than its upper portion.

19. A fish trap having a buoyed head line; a net depending therefrom; a board adapted broadside to resist movement through the water, and a bridle and line engaging the lower part of the net and attached to the side of and adapted to pull said board, the bridle being arranged with its attachments holding the board at an angle not perpendicular to the direction of pull; and a float adapted to sustain the weight of the board in the water and attached to the upper portion of said board.

20. A fish trap having a buoyed head line; a side net depending therefrom; a bottom net attached to its lower edge; and a purse line extending along the free edge of the bottom net; the whole being adapted to be set from a moving boat; combined with a sea anchor attached to the purse line.

21. A fish trap having a buoyed head line; netting supported therefrom; and a purse line extending along the free edge of the netting; the whole being adapted to be set from a moving boat; combined with a sea anchor attached to the purse line.

22. A fish trap having a buoyed head line; a netting supported therefrom; and a purse line extending along the free edge of the netting; the whole being adapted to be set from a moving boat; combined with a sea anchor attached to the purse line; means whereby the anchor dives away from the boat when dropped; and means on the boat to pay out the purse line more slowly than the net.

23. A fish trap having a buoyed head line; a netting supported therefrom; and a purse line extending along the free edge of the netting; the whole being adapted to be set from a moving boat; combined with a sea anchor attached to the purse line; and means to maintain the anchor at a predetermined depth from the surface of the water.

24. A fish trap having in combination a side net, a bottom net attached to it and adapted to lie hauled straight along the foot line of the side net when extended as long as said foot line is; a purse line attached loosely along the free edge of the bottom net; and a sea anchor adapted to hold the end of the nets and purse line, the whole being adapted to be set from a moving boat, and the purse line and its attachments being adapted, when its paid out portion is shorter than the set portion of the net, to form a line crossing the curve in which the said portion is set, and thereby to spread the said bottom net under the segment thus constituted, and means on the boat to engage the purse line and to control its outboard length.

25. A fish trap having a buoyed head line set in a curve; a netting supported therefrom; a board attached to the lower part of the end of said netting and adapted by its attachment to dive inward from the netting when pulled forward; and means for pulling it forward when the netting is being set; the surface of said board being adapted to scare fish away from its region.

26. An improvement in the art of fishing with a net having a buoyed head line and a bottom purse line comprising the anchoring of one end of the net and purse line below the surface of the sea, followed by the paying out of the net in a curve along the surface of the sea with simultaneous paying out of the purse line less rapidly, thereby delimiting a segment between the purse line and the head line and at the same time spreading the lower part of the net therethrough.

27. An improvement in the art of fishing with a net having a buoyed head line and a bottom purse line comprising the dropping of the beginning of the net and purse line attached to a sea anchor from a moving boat; sailing the boat in a curve and simultaneously paying out the head line and net at substantially the boat's speed and paying out the purse line less rapidly, whereby the sailing power of the boat is utilized to draw said purse line and the free bottom edge of the net into a position delimiting a segment between the purse line and the head line.

In testimony whereof I hereto affix my signature.

JOHN J. MATHESON.